US010763743B1

(12) United States Patent
Zuccollo

(10) Patent No.: US 10,763,743 B1
(45) Date of Patent: Sep. 1, 2020

(54) ANALOG PREDICTIVE DEAD-TIME

(71) Applicant: Infineon Technologies AG, Neubiberg (DE)

(72) Inventor: Andrea Zuccollo, Villa del Conte (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/294,805

(22) Filed: Mar. 6, 2019

(51) Int. Cl.
*H02M 1/38* (2007.01)
*H02M 1/08* (2006.01)

(52) U.S. Cl.
CPC .............. *H02M 1/38* (2013.01); *H02M 1/08* (2013.01)

(58) Field of Classification Search
None
See application file for complete search history.

(56) References Cited

U.S. PATENT DOCUMENTS 7,190,596 B2 * 3/2007 Durbaum ........... H05B 41/2828 363/16
2016/0118893 A1 * 4/2016 Doyle .................... H02M 1/38 323/271
2018/0026518 A1 * 1/2018 Liu .................... H02M 3/1584 323/312

* cited by examiner

*Primary Examiner* — Lincoln D Donovan
*Assistant Examiner* — Khareem E Almo
(74) *Attorney, Agent, or Firm* — Shumaker & Sieffert, P.A.

(57) ABSTRACT

A controller circuit for controlling switching elements and controlling dead-time of the switching elements is configured to generate a phase difference voltage using voltage at a control node of a first switching element and voltage at a control node of a second switching element. The first switching element is configured to couple a first node of a supply and a switch node and the second switching element is configured to couple the switch node and a second node of the supply. The controller circuit is further configured to generate a first driving signal based on a first pulse width modulation (PWM) signal for the first switching element and the phase difference voltage. The first driving signal includes a voltage-controlled delay module. The controller circuit is further configured to generate a second driving signal for driving the second switching element based a second PWM signal for the second switching element.

16 Claims, 10 Drawing Sheets

510
516
507
506
566
576
586
hs_on from control
hs_on_sensed to control
medium voltage clamp i.e. zener
low voltage clamp i.e. forward diodes
518
508
568
578
588
509
ls_on from control
ls_on_sensed to control
medium voltage clamp i.e. zener
low voltage clamp i.e. forward diodes

ANALOG PREDICTIVE DEAD-TIME

TECHNICAL FIELD

This disclosure relates analog-based techniques for predicting a dead-time between switching two switches, for example, of a half-bridge used as a power stage of a Switching-Mode Power Supply (SMPS).

BACKGROUND

A duty cycle of a Switching-Mode Power Supply (SMPS) may be controlled to regulate a voltage, current, or power supplied to a load. A controller for the SMPS generates a Pulse-Width Modulation (PWM) signal that includes a first portion to drive a high-side switch to be switched in and a low-side switch to be switched out and a second portion to drive the high-side switch to be switched out and the low-side switch to be switched in. The PWM signal may include a dead-time portion that is selected to avoid simultaneously switching in both the high-side switch and the low-side switch.

SUMMARY

In general, this disclosure is directed to techniques for minimizing dead-time when alternatively switching a first switching element and a second switching element. For example, a circuit for controlling switching elements and controlling dead-time of the switching elements may generate a phase difference voltage using voltage at a control node of a first switching element and voltage at a control node of a second switching element and may generate a first driving signal based on a first Pulse Width Modulation (PWM) signal for the first switching element and the phase difference voltage. In this way, the circuit may help to minimize dead-time for alternatively switching the first switching element and the second switching element while helping to ensure that only one of the first switching element and the second switching element are switched in.

In an example, a circuit for controlling switching elements and controlling dead-time of the switching elements is configured to: generate a phase difference voltage using voltage at a control node of a first switching element and voltage at a control node of a second switching element, the first switching element configured to couple a first node of a supply and a switch node based on voltage at the control node of the first switching element and the second switching element configured to couple the switch node and a second node of the supply based on voltage at the control node of the second switching element, generate a first driving signal based on a first PWM signal for the first switching element and the phase difference voltage, wherein the first driving signal includes a voltage-controlled delay module, and generate a second driving signal for driving the second switching element based a second PWM signal for the second switching element.

In another example, a method for controlling switching elements and controlling dead-time of the switching elements includes: generating, by processing circuitry, a phase difference voltage using voltage at a control node of a first switching element and voltage at a control node of a second switching element, the first switching element configured to couple a first node of a supply and a switch node based on voltage at the control node of the first switching element and the second switching element configured to couple the switch node and a second node of the supply based on voltage at the control node of the second switching element, generating, by the processing circuitry, a first driving signal based on a first PWM signal for the first switching element and the phase difference voltage, wherein the first driving signal includes a voltage-controlled delay module, and generating, by the processing circuitry, a second driving signal for driving the second switching element based a second PWM signal for the second switching element.

In another example, a system includes: a first switching element configured to couple a first node of a supply and a switch node based on voltage at a control node of the first switching element, a second switching element configured to couple the switch node and a second node of the supply based on voltage at a control node of the second switching element, and processing circuitry for controlling dead-time. The processing circuitry is configured to: generate a phase difference voltage using voltage at the control node of the first switching element and voltage at the control node of the second switching element, generate a first driving signal based on a first PWM signal for the first switching element and the phase difference voltage, wherein the first driving signal includes a voltage-controlled delay module, and generate a second driving signal for driving the second switching element based a second PWM signal for the second switching element.

Details of these and other examples are set forth in the accompanying drawings and the description below. Other features, objects, and advantages will be apparent from the description and drawings, and from the claims.

DETAILED DESCRIPTION

Figure 1:
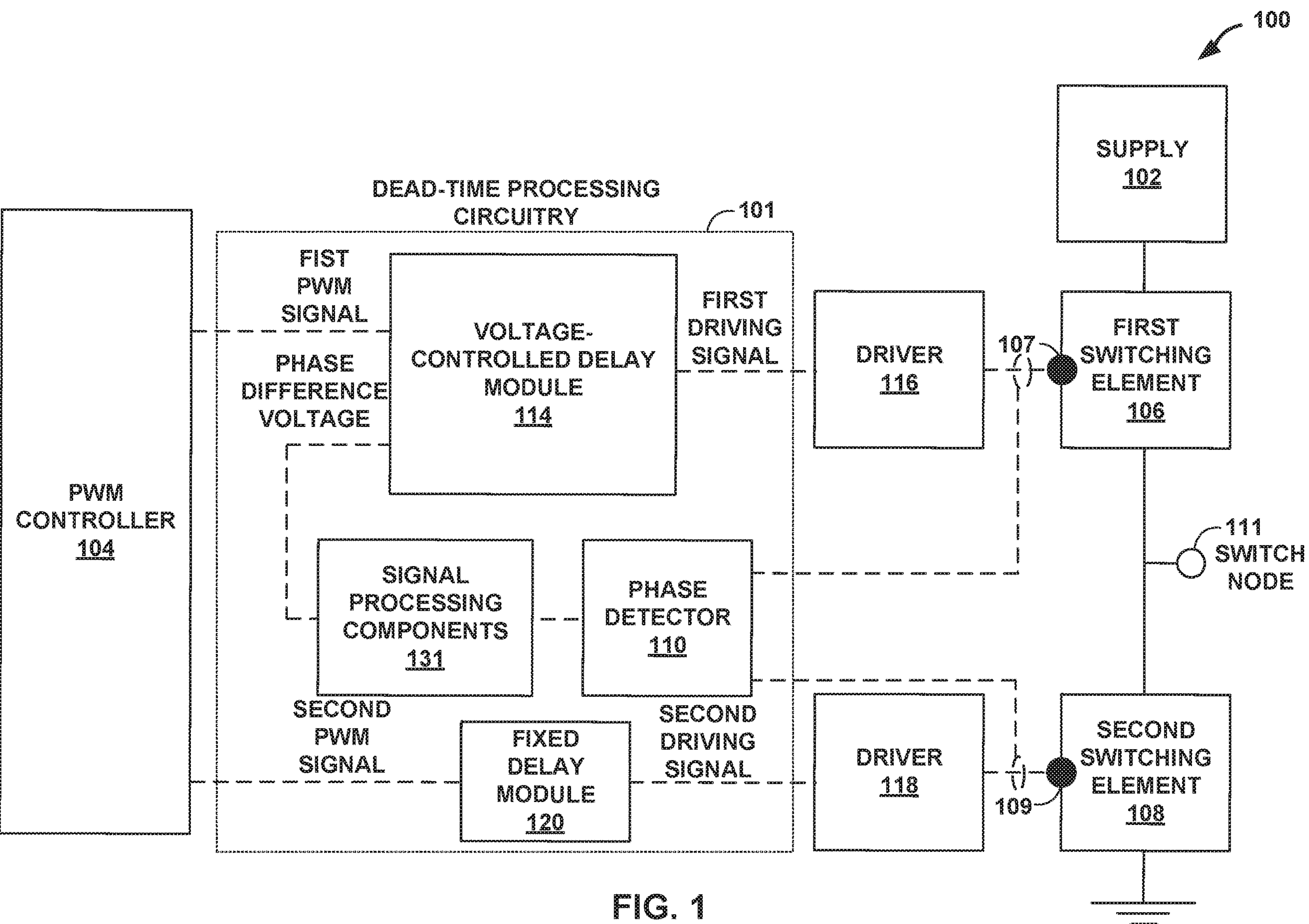
FIG. 1 is a block diagram illustrating an example system, in accordance with one or more techniques of this disclosure.

This disclosure is directed to techniques in the synchronous switching mode power-supply field, in particular where a half bridge is used as power stage (e.g. buck regulator), to improve the efficiency of the regulator. For example, techniques may be used in the control of dead-time needed between an on-phase of a low-side of a half bridge and an on-phase of a high-side of the half bridge. In such systems, decreasing the amount of dead-time may result in higher efficiency and less the power loss. However, missing dead-time may result in cross-conductions, which may damage and/or degrade the half bridge device. Therefore, systems may control dead-time to improve efficiency while avoiding harmful cross-conduction between switching elements of the half bridge.

Some systems may use a constant and/or fixed delay module between an on-phase of a low-side of a half bridge and an on-phase of a high side of the half bridge. Such systems may be simple to implement based on the introduction of a fixed delay module (e.g., sized by simulation) but are not efficient due to a margin needed in the worst-case scenario (e.g., considering driver voltage supply, process and temperature, etc.)

Some systems may use an adaptive delay that are based on a sensing an off-state of opposite power-stage. For example, low-side power is allowed to be turned on only when the high-side power is turned off. Such systems may be robust in avoiding the cross-conduction compared to systems using constant and/or fixed delay module but may limit a dead-time to propagation delays of sensing structures and driver stages.

Some systems may use digital predictive delay techniques that are based on cycle-by-cycle control of dead-time and/or based on a sensing of a parameters in previous cycle. Sensed parameters may be the low-side body diode or the switch node or input current. Systems using digital predictive delay may offer improved performance compared to constant delay or adaptive delay systems but are more complex compared to constant delay or adaptive delay systems. Such systems may rely on digital circuitry, through a use of digital Delay-Locked Loop (DLL). Systems using digital DLL may be limited by a granularity of a minimum delay, and, thus, may not achieve a zero dead-time.

Techniques described herein include processes that are based on a totally analogic approach and on an indirect measure. Such techniques may use an approach of sensing a gate voltage of the power elements composing the half-bridge. Providing the information of the sensed gates as inputs to the phase detector of an analog Phase-Locked Loop (PLL) may allow for synchronization between a rising edge of sensed gate of high-side power, with the falling edge of sensed gate of low-side power. The phase error between the two inputs may be integrated through voltage control of a delay element composing the dead time. Using analog control may overcome the limitations of the quantization of digital DLL. In this way, techniques described herein may allow systems to switch between an on-phase of a low-side of a half bridge and an on-phase of a high side of the half bridge with zero dead-time.

FIG. 1 is a block diagram illustrating an example system 100, in accordance with one or more techniques of this disclosure. As illustrated in the example of FIG. 1, system 100 may include dead-time processing circuitry 101, supply 102, Pulse Width Modulation (PWM) controller 104, first switching element 106, second switching element 108, driver 116, driver 118, and one or more signal processing components 131 ("signal processing components 131"). In some examples, system 100 may be implemented as an analog circuit.

Supply 102 may be configured to provide electrical power to one or more other components of system 100. For instance, supply 102 may be configured to supply power to switch node 111. In some examples, supply 102 includes a battery which may be configured to store electrical energy. Examples of batteries may include, but are not limited to, nickel-cadmium, lead-acid, nickel-metal hydride, nickel-zinc, silver-oxide, lithium-ion, lithium polymer, any other type of rechargeable battery, or any combination of the same. In some examples, supply 102 may include an output of a linear voltage regulator, a power converter, or a power inverter. For instance, supply 102 may include an output of a DC to DC power converter, an AC to DC power converter, and the like. In some examples, supply 102 may represent a connection to an electrical supply grid. In some examples, the input power signal provided by supply 102 may be a DC input power signal. For instance, in some examples, supply 102 may be configured to provide a DC input power signal in the range of ~5 $V_{DC}$ to ~40 $V_{DC}$.

First switching element 106 may be configured to couple a first node (e.g., positive) of supply 102. Second switching element 108 may be configured to couple switch node 111 and a second node (e.g., negative) of supply 102 based on voltage at control node 109 of second switching element 108. First switching element 106 and second switching element 108 may form a half-bridge, for example, for a switching-mode power supply. For example, first switching element 106 may be a high-side switching element of a half-bridge and second switching element 108 may be a low-side switching element of the half-bridge.

Examples of switching elements may include, but are not limited to, a Silicon-Controlled Rectifier (SCR), a Field Effect Transistor (FET), and a Bipolar Junction Transistor (BJT). Examples of FETs may include, but are not limited to, a Junction Field-Effect Transistor (JFET), a metal-oxide-semiconductor FET (MOSFET), a dual-gate MOSFET, an Insulated-Gate Bipolar Transistor (IGBT), any other type of FET, or any combination of the same. Examples of MOSFETS may include, but are not limited to, a depletion mode p-channel MOSFET (PMOS), an enhancement mode PMOS, depletion mode n-channel MOSFET (NMOS), an enhancement mode NMOS, a double-diffused MOSFET (DMOS), any other type of MOSFET, or any combination of the same. Examples of BJTs may include, but are not limited to, PNP, NPN, heterojunction, or any other type of BJT, or any combination of the same. Switching elements may be high-side or low-side switching elements. Additionally, switching elements may be voltage-controlled and/or current-controlled. Examples of current-controlled switching elements may include, but are not limited to, gallium nitride (GaN) MOSFETs, BJTs, or other current-controlled elements.

Driver 116 may be configured to drive first switching element 106 based on a first driving signal output by dead-time processing circuitry 101. For example, driver 116 may amplify a signal output by dead-time processing circuitry 101 to drive first switching element 106 to switch-in to establish a channel electrically coupling a first node (e.g., positive) of supply 102 and switch node 111 or to drive first switching element 106 to switch-out to refrain from establishing a channel electrically coupling the first node of supply 102 and switch node 111.

Driver 118 be configured to drive second switching element 108 based on a second driving signal output by dead-time processing circuitry 101. For example, driver 118 may amplify a signal output by dead-time processing circuitry 101 to drive second switching element 108 to switch-in to establish a channel electrically coupling a second node (e.g., negative) of supply 102 and switch node 111 or to drive second switching element 108 to switch-out to refrain from establishing a channel electrically coupling the second node of supply 102 and switch node 111. In some cases, driver 116 may be referred to as a high-side driver, and driver 118 may be referred to as a low-side driver.

PWM controller 104 may be configured to generate a first PWM signal for first switching element 106 and a second PWM signal for second switching element 108. In some examples, PWM controller 104 may be configured to generate the first PWM signal for first switching element 106 and the second PWM signal for second switching element 108 with zero dead-time. PWM controller 104 may include an analog circuit. PWM controller 104 may be a microcontroller on a single integrated circuit containing a processor core, memory, inputs, and outputs. For example, PWM controller 104 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, PWM controller 104 may be a combination of one or more analog components and one or more digital components.

Dead-time processing circuitry 101 may be configured to switch first switching element 106 and second switching element 108 and to control a dead-time of first switching element 106 and second switching element 108. Dead-time processing circuitry 101 may include phase detector 110, voltage-controlled delay module 114, and fixed delay module 120.

Figure 5:
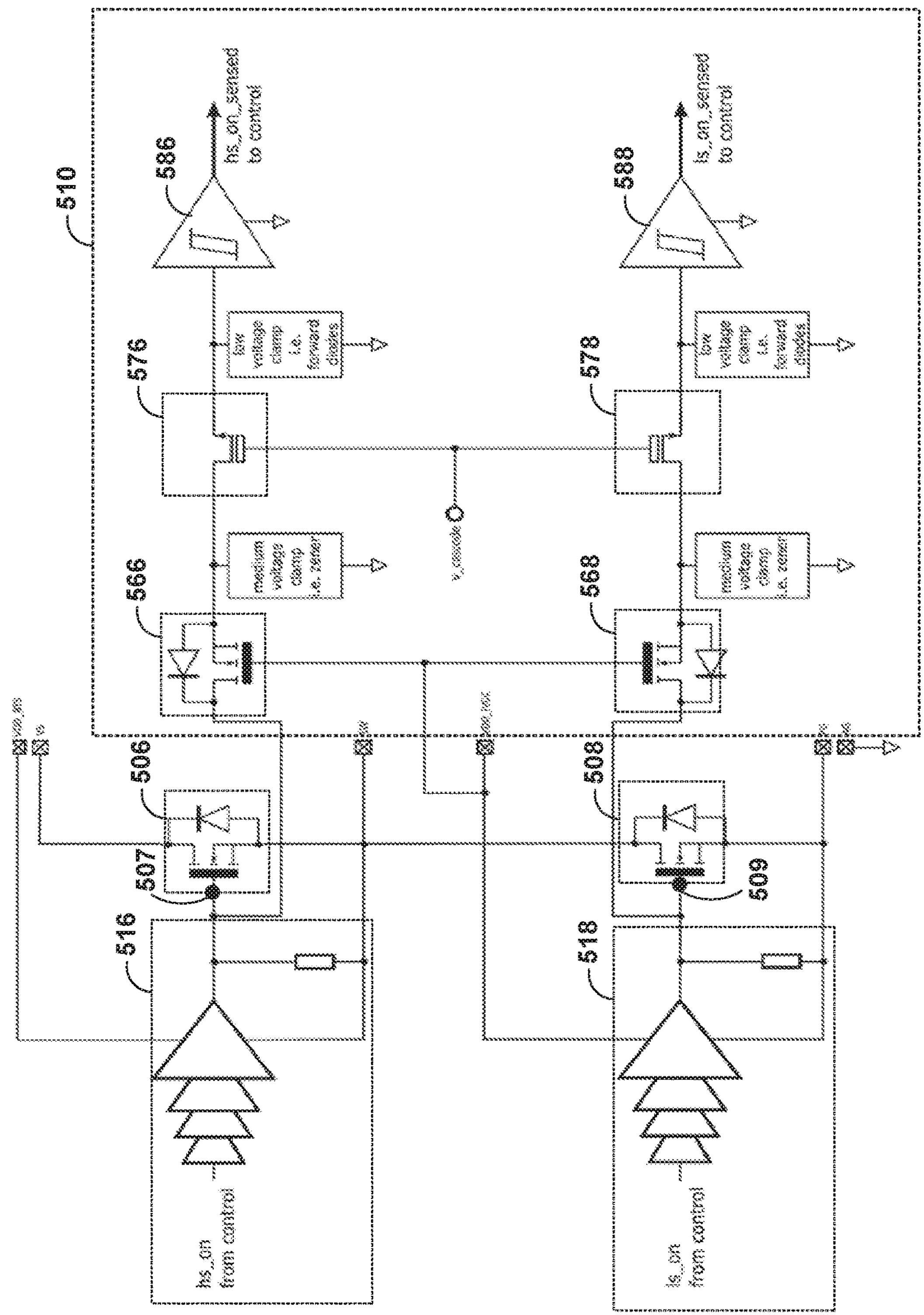
FIG. 5 is a conceptual diagram illustrating an example phase detector, in accordance with one or more techniques of this disclosure.

Phase detector 110 may be configured to generate a phase difference voltage using voltage at control node 107 of first switching element 106 and voltage at control node 109 of second switching element 108. FIG. 5 illustrates an example phase detector in further detail.

Signal processing components 131 may process an output of phase detector 110 for use by voltage-controlled delay module 114. For example, signal processing components 131 may include a charge pump, a low-pass filter, a logic component (e.g., flip flop or latch circuits), or other signal processing components.

Fixed delay module 120 may be configured to generate a second driving signal for driving second switching element 108 based a second PWM signal output by PWM controller 104 for second switching element 108. For example, fixed delay module 120 may be configured to generate the second driving signal to correspond to the second PWM signal with a fixed delay. Fixed delay module 120 may apply preconfigured fixed delay. For example, fixed delay module 120 may apply a preconfigured fixed delay that is sized by simulation.

Voltage-controlled delay module 114 may be configured to generate the first driving signal based on the PWM signal output by PWM controller 104 for first switching element 106 and the phase difference voltage output by phase detector 110. Voltage-controlled delay module 114 may be configured to generate the first driving signal to include zero dead-time with the second driving signal.

In accordance with one or more techniques, phase detector 110 may be configured to generate a phase difference voltage using voltage at control node 107 of first switching element 106 and voltage at control node 109 of second switching element 108. Voltage-controlled delay module 114 may be configured to generate a first driving signal based on a first PWM signal output by PWM controller 104 for first switching element 106 and the phase difference voltage. Fixed delay module 120 may be configured to generate a second driving signal for driving second switching element 108 based a second PWM signal output by PWM controller 104 for second switching element 108.

System 100 may represent an analog loop based on PLL capable to nullify the dead time in a half bridge through the sensing of gate-source voltage. In this way, system 100 may allow a higher level of integration of the application (e.g., system level) due to the reduction in the power losses and the consequent reduction of cooling requirements.

While the example of FIG. 1 illustrates voltage-controlled delay module 114 controlling a delay of a high-side switching element and using a fixed delay module for a low-side switching element, in other examples, voltage-controlled delay module 114 may be configured to control a delay of a low-side switching element and a fixed delay module may be used for a high-side switching element.

Figure 2:
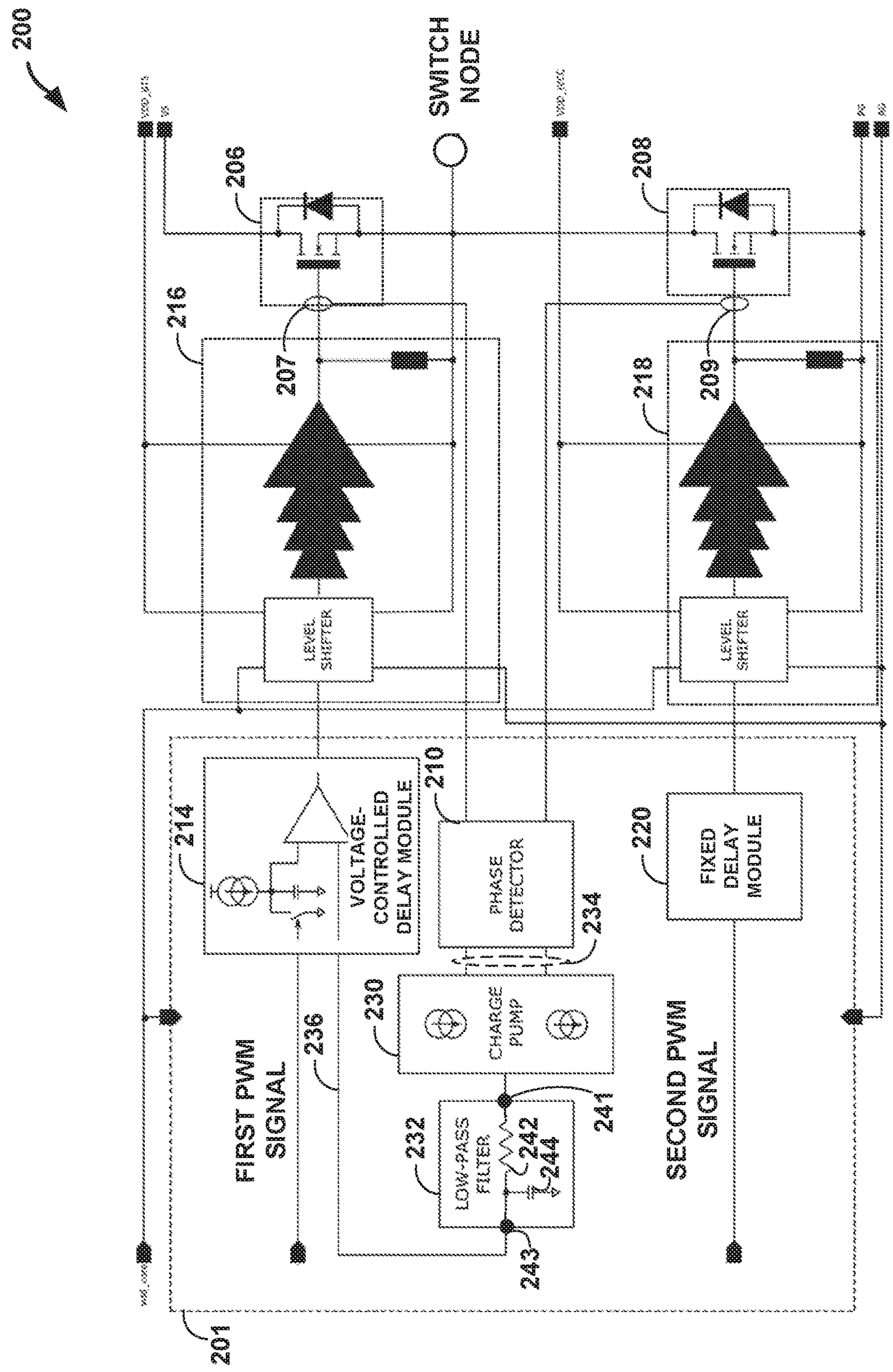
FIG. 2 is a conceptual diagram illustrating an example circuit, in accordance with one or more techniques of this disclosure.

FIG. 2 is a conceptual diagram illustrating an example circuit 200, in accordance with one or more techniques of this disclosure. FIG. 2 is discussed with reference to FIG. 1 for example purposes only. Circuit 200 may include dead-time processing circuitry 201, first switching element 206, second switching element 208, driver 216, and driver 218, which may be examples of dead-time processing circuitry 101, first switching element 106, second switching element 108, driver 116, and driver 118, respectively. Dead-time processing circuitry 201 may include phase detector 210, fixed delay module 220, and voltage-controlled delay module 214, which may be examples of phase detector 110, fixed delay module 120, and voltage-controlled delay module 114, respectively. As shown, dead-time processing circuitry 201 also includes charge pump 230 and low pass filter 232, which may be example components of signal processing components 131. Circuit 200 may be an analog circuit. For example, phase detector 210, charge pump 230, low pass filter 232, and voltage-controlled delay module 214 may form an analog loop.

In the example of FIG. 2, phase detector 210 may generate unfiltered error signal 234 based on voltage at control node 207 of first switching element 206 and voltage at control node 209 of second switching element 208. Charge pump 230 may integrate a magnitude of unfiltered error signal 234 before filtering. Low pass filter 232 filters unfiltered error signal 234 to generate phase difference voltage 236. Low pass filter 232 may include a resistive element 242 comprising a first node 241 configured to receive unfiltered error signal 234 from charge pump 230 and second node 243 configured to output phase difference voltage 236 and a capacitor 244 coupled to second node 243 of resistive element 242.

Figure 3:
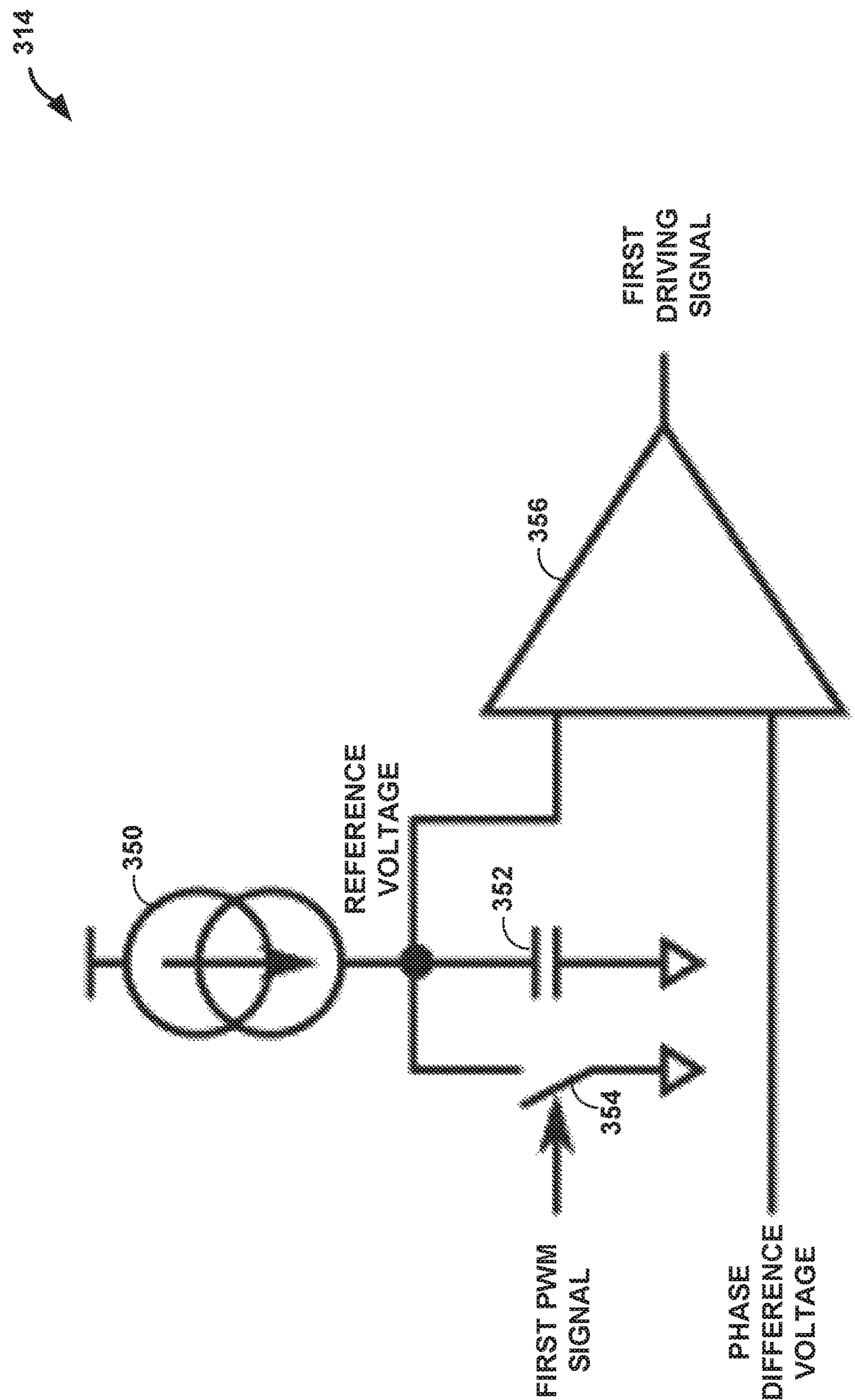
FIG. 3 is a conceptual diagram illustrating an example voltage-controlled delay module, in accordance with one or more techniques of this disclosure.

FIG. 3 is a conceptual diagram illustrating an example voltage-controlled delay module 314, in accordance with one or more techniques of this disclosure. FIG. 3 is discussed with reference to FIGS. 1-2 for example purposes only. Voltage-controlled delay module 314 may be an example of voltage-controlled delay module 114. As shown, voltage-controlled delay module 314 may include current source 350, capacitor 352, switching element 354, and comparator 356. Current source 350 may be configured to charge capacitor 352 when the first PWM signal indicates an enabled state. Capacitor 352 may be configured to store a reference voltage. Switching element 354 may be configured to discharge capacitor 352 when the first PWM signal is not in the enabled state. Comparator 356 may be configured to compare the reference voltage stored at capacitor 352 and the phase difference voltage to generate the first driving signal.

To generate the first driving signal, voltage-controlled delay module 314 may be configured to generate the first driving signal based on the phase difference voltage and a reference voltage generated based on the first PWM signal. For example, voltage-controlled delay module 314 may be configured to generate the first driving signal based on the phase difference voltage and the reference voltage stored at capacitor 352. More specifically, comparator 356 may be configured to generate the first driving signal based on a comparison of the phase difference voltage and the reference voltage generated based on the first PWM signal. For example, comparator 356 may be configured to generate the first driving signal based on a comparison of the phase difference voltage and the reference voltage stored at capacitor 352.

In accordance with technotes described herein, comparator 356 may be configured to generate the first driving signal to switch in a switching element (e.g., first switching element 106) in response to voltage at capacitor 352 being greater than the phase difference voltage and to switch out the switching element in response to voltage at capacitor 352 being not greater than the phase difference voltage.

Figure 4:
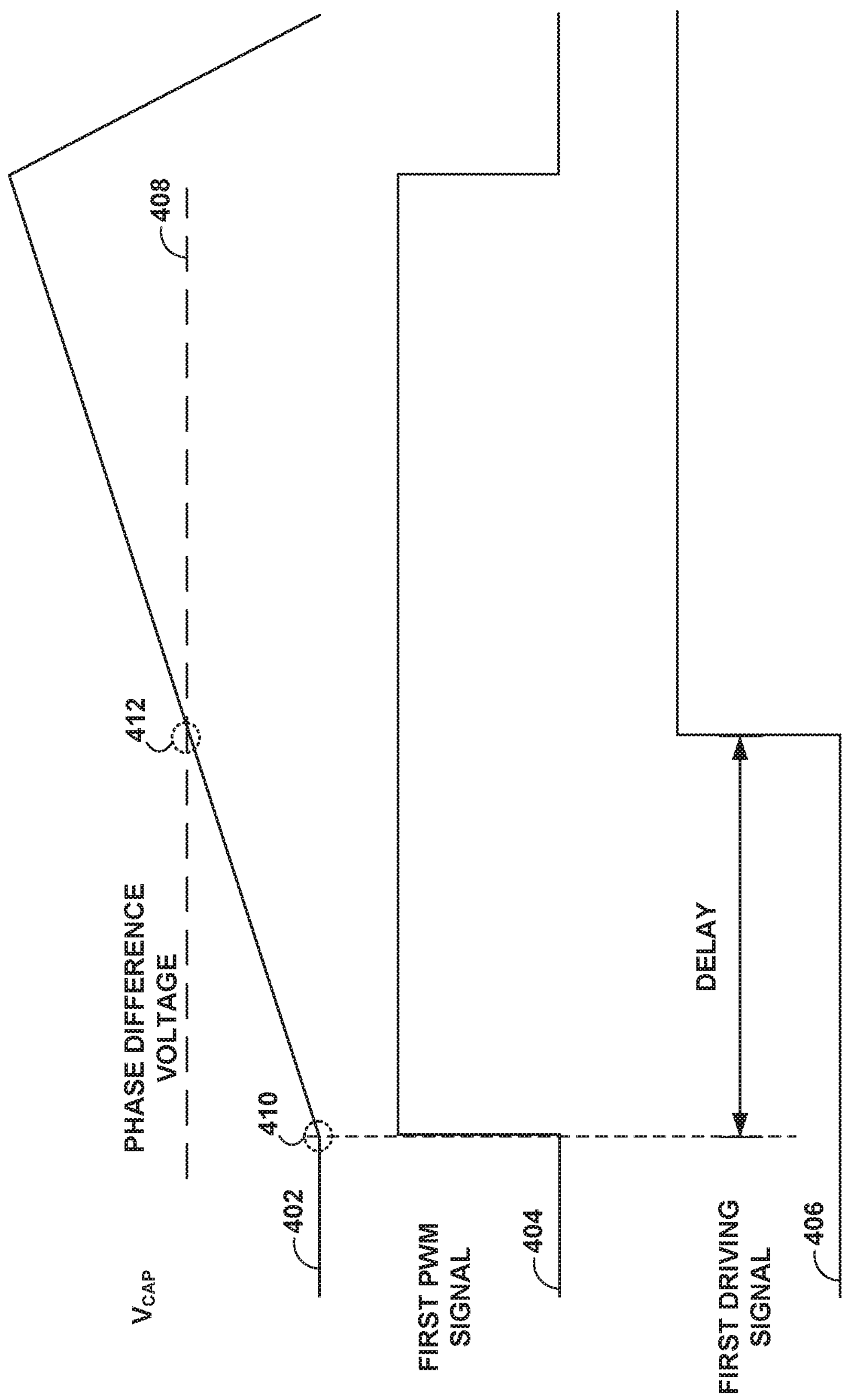
FIG. 4 is a diagram illustrating an example performance of the voltage-controlled delay module of FIG. 3, in accordance with one or more techniques of this disclosure.

FIG. 4 is a diagram illustrating an example performance of voltage-controlled delay module 314 of FIG. 3, in accordance with one or more techniques of this disclosure. FIG. 4 is discussed with reference to FIGS. 1-3 for example purposes only. The abscissa axis (e.g., horizontal) of FIG. 4 represents time and the ordinate axis (e.g., vertical) of FIG. 4 represents a capacitor voltage 402 ("$V_{CAP}$") at capacitor 352, a first PWM signal 404 received at a control node of switching element 354, and first driving signal 406 output by comparator 356.

In the example of FIG. 4, at time 410, switching element 354 is enabled (e.g., switched in), which causes current source 350 to increase capacitor voltage 402. At time 412, comparator 356 transitions first driving signal 406 to an enabled state in response to capacitor voltage 402 exceeding phase difference voltage 408. In this way, voltage-controlled delay module 314 may add a difference between time 410 and time 412 as a voltage-controlled delay module.

FIG. 5 is a conceptual diagram illustrating an example phase detector 510, in accordance with one or more techniques of this disclosure. FIG. 5 is discussed with reference to FIGS. 1-4 for example purposes only. Phase detector 510 may be an example of phase detector 110. As shown, phase detector 510 may receive an output from driver 516, which may be an example of driver 116, to drive first switching element 506, which may be an example of first switching element 106. Similarly, phase detector 510 may receive an output from driver 518, which may be an example of driver 118, to drive second switching element 508, which may be an example of second switching element 108. As shown, phase detector 510 may include first source-follower element 566, first attenuation module 576, first comparator 586, second source-follower element 568, second attenuation module 578, second comparator 588.

Phase detector 510 may be configured to generate a state signal for first switching element 506 using a comparison of an indication of voltage at control node 507 of first switching element 506 with a first threshold. For example, first source-follower element 566 may be configured to generate a voltage signal corresponding to voltage at control node 507 of first switching element 506. First attenuation module 576 may be configured to generate the indication of voltage at control node 507 of first switching element 506 using the voltage signal of voltage at control node 507 of first switching element 506. First comparator 586 may be configured to compare the indication of voltage at control node 507 of first switching element 506 with a first threshold and output the state signal for first switching element 506. In some examples, the first threshold is slightly below the threshold (VTH≤vth0) of first switching element 506.

Phase detector 510 may be configured to generate a state signal for second switching element 508 using a comparison of an indication of voltage at control node 509 of second switching element 508 with a second threshold. For example, second source-follower element 568 may be configured to generate a voltage signal corresponding to voltage at control node 509 of second switching element 508. Second attenuation module 578 may be configured to generate the indication of voltage at control node 509 of second switching element 508 using the voltage signal corresponding to voltage at control node 509 of second switching element 508. Second comparator 588 may be configured to compare the indication of voltage at control node 509 of second switching element 508 with a second threshold and output the state signal for second switching element 508. In some examples, the second threshold is slightly below the threshold (VTH≤vth0) of second switching element 508.

In this way, dead-time processing circuitry 101 may be configured to generate the phase difference voltage using the state signal for first switching element 506 and the state signal for second switching element 508. For example, a charge pump may integrate the state signal for first switching element 506 and the state signal for second switching element 508 and a low pass filter may filter the output of the charge pump to generate the phase difference voltage (see FIG. 2).

In the example of FIG. 5, first attenuation module 576 may use an N-MOS of the same class as first source-follower element 566 to clamp harmful voltages, and at the same time to safely propagate the information of the power gate-source voltage to first comparator 586, such a low-voltage fast Schmitt trigger (also other types of clamping structures and/or voltage comparator can be considered). Similarly, second attenuation module 578 may use an N-MOS of the same class as second source-follower element 568 to clamp harmful voltages, and at the same time to safely propagate the information of the power gate-source voltage to second comparator 588, such a low-voltage fast Schmitt trigger (also other types of clamping structures and/or voltage comparator can be considered).

Figure 6:
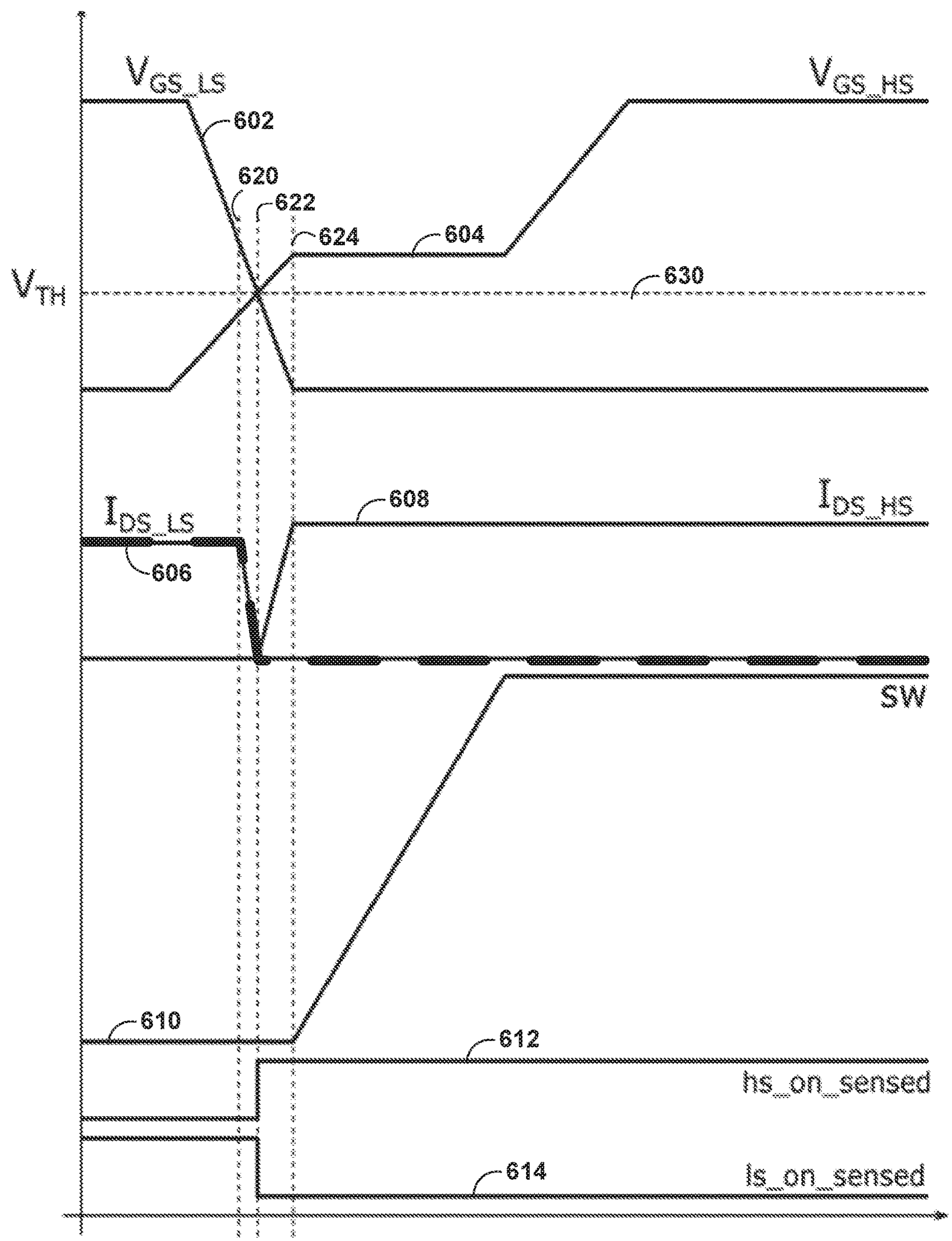
FIG. 6 is a diagram illustrating a first performance of system of FIG. 1, in accordance with one or more techniques of this disclosure.

FIG. 6 is a diagram illustrating a first performance of system of FIG. 1, in accordance with one or more techniques of this disclosure. FIG. 6 is discussed with reference to FIGS. 1-5 for example purposes only. The abscissa axis (e.g., horizontal) of FIG. 6 represents time and the ordinate axis (e.g., vertical) of FIG. 6 represents low-side gate voltage 602 ("$V_{GS\_LS}$") at control node 109 of second switching element 108, high-side gate voltage 604 ("$V_{GS\_HS}$") at control node 107 of first switching element 106, low-side current 606 ("$I_{DS\_LS}$") at second switching element 108, high-side current 608 ("$I_{DS\_HS}$") at first switching element 106, switch node voltage 610 at switch node 111, high-side digitalized output 612 of the sensing in the high-side gate voltage ("hs_on_sensed") for first switching element 106, and low-side digitalized output 614 of the sensing in the low-side gate voltage ("ls_on_sensed") for second switching element 108. Voltage threshold 630 ("$V_{TH}$") corresponds to a turn-on threshold of first switching element 106 and second switching element 108. For instance, voltage threshold 630 ("$V_{TH}$") may be slightly less than a turn-on threshold of first switching element 106 and second switching element 108.

FIG. 6 illustrates example voltages on control node 107 of first switching element 106 and control node 109 of second switching element 108 in a situation where a zero dead time condition may be reached. For example, at time 620, low-side current 606 starts to fall. At time 622, low-side current 606 reaches zero and high-side current 608 starts to rise. At time 624, high-side current 608 reaches a peak value. Using voltage threshold 630 as a voltage equal or below the turn-on threshold ("vth0") of first switching element 106 and second switching element 108, system 100 may help to ensure cross-conduction on both first switching element 106 and second switching element 108 is avoided. Nulling the phase error between the rising edge of high-side gate voltage 604, with the falling edge of low-side gate voltage 602 helps to minimize dead time, which may maximize a switching efficiency of first switching element 106 and second switching element 108.

Figure 7A:
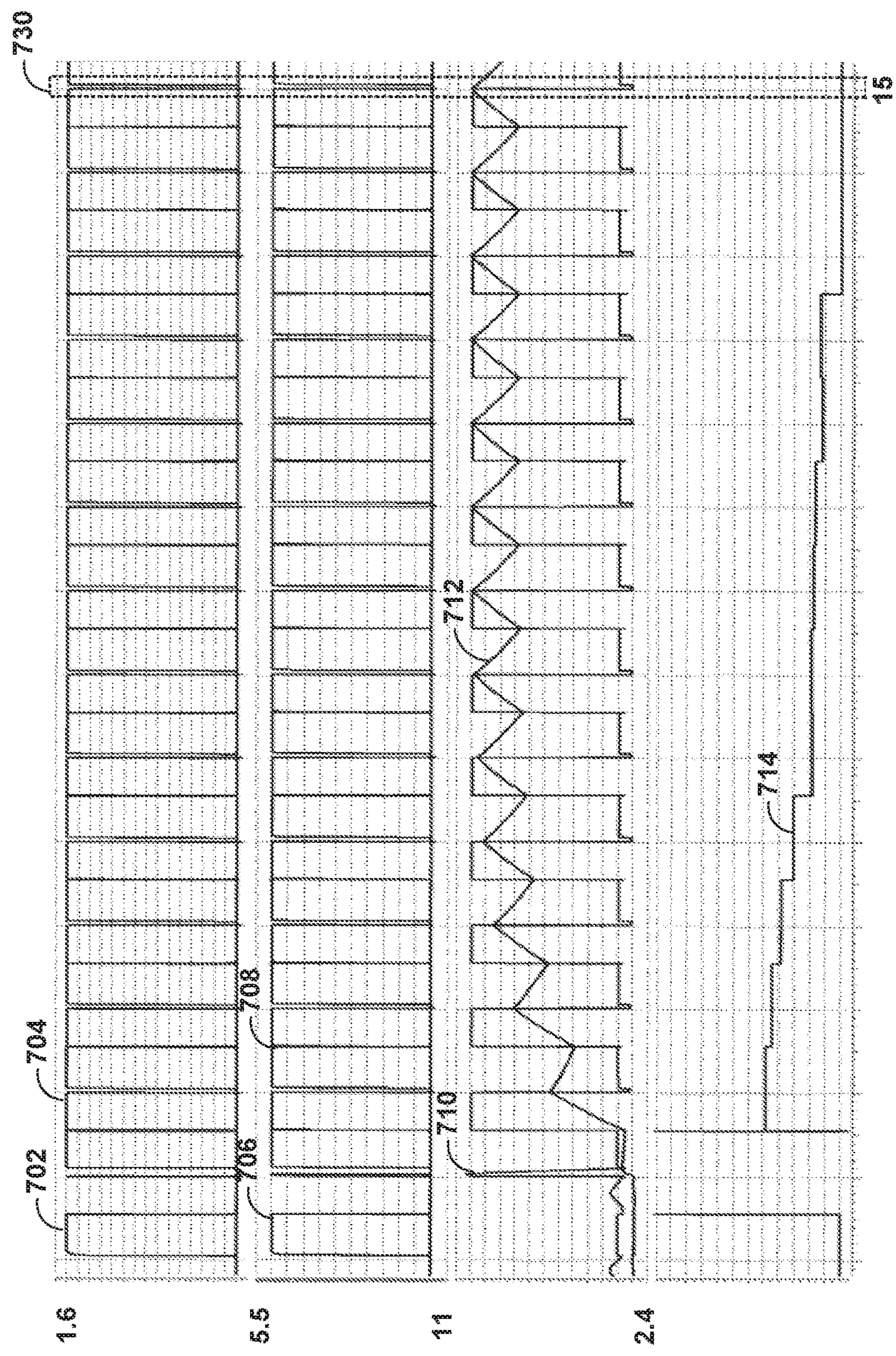
FIG. 7A is a diagram illustrating a second performance of system of FIG. 1, in accordance with one or more techniques of this disclosure.

FIG. 7A is a diagram illustrating a second performance of system of FIG. 1, in accordance with one or more techniques of this disclosure. FIG. 7A is discussed with reference to FIGS. 1-6 for example purposes only. The abscissa axis (e.g., horizontal) of FIG. 7 represents time and the ordinate axis (e.g., vertical) of FIG. 7A represents low-side digitalized output 702 of the sensing in the low-side gate voltage for second switching element 108, high-side digitalized output 704 of the sensing in the high-side gate voltage for first switching element 106, low-side gate voltage 706 at control node 109 of second switching element 108, high-side gate voltage 708 at control node 107 of first switching element 106, switch node voltage 710 at switch node 111, inductor current 712 of an inductor coupled to switch node 111, and dead time 714. FIG. 7A illustrates an example of how dead time 714 of the transition of switch node from low to high is reduced cycle-by-cycle by analog control loop of system 100.

Figure 7B:
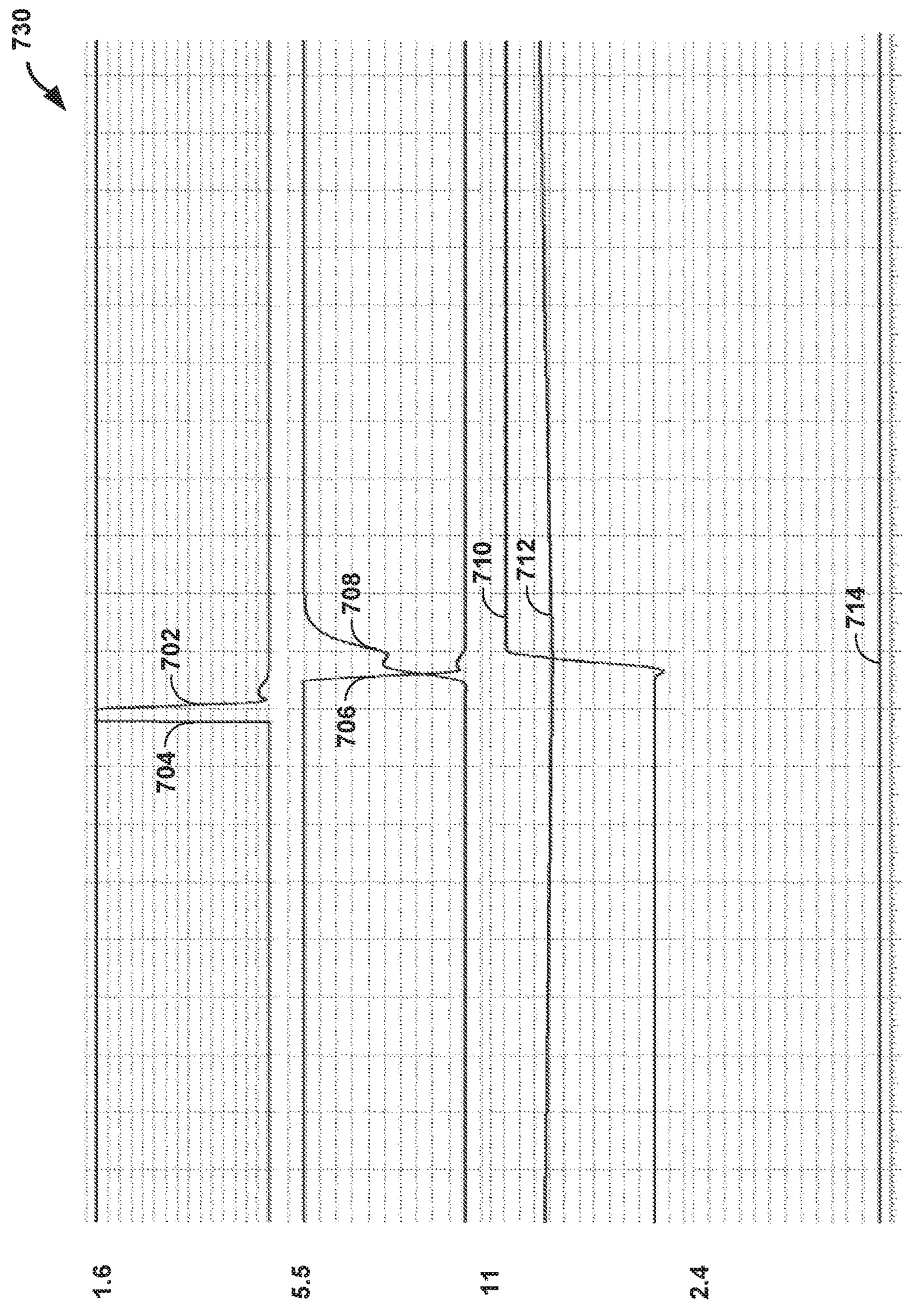
FIG. 7B is a diagram illustrating a portion of FIG. 7A in further detail, in accordance with one or more techniques of this disclosure.

FIG. 7B is a diagram illustrating a portion 730 of FIG. 7A in further detail, in accordance with one or more techniques of this disclosure. FIG. 7B is discussed with reference to FIGS. 1-6, 7A for example purposes only. FIG. 7B illustrates how system 100 may nullify dead time 714. As shown, switch node voltage 710 has negligible undershoot below ground. Low-side gate voltage 706 and high-side gate voltage 708 do not overlap for values above the threshold voltage. As shown, low-side digitalized output 702 and high-side digitalized output 704 are overlapping due to different propagation delay of Low-Side and High-Side chains. Dead time 714 remains constant at approximately zero.

Figure 8:
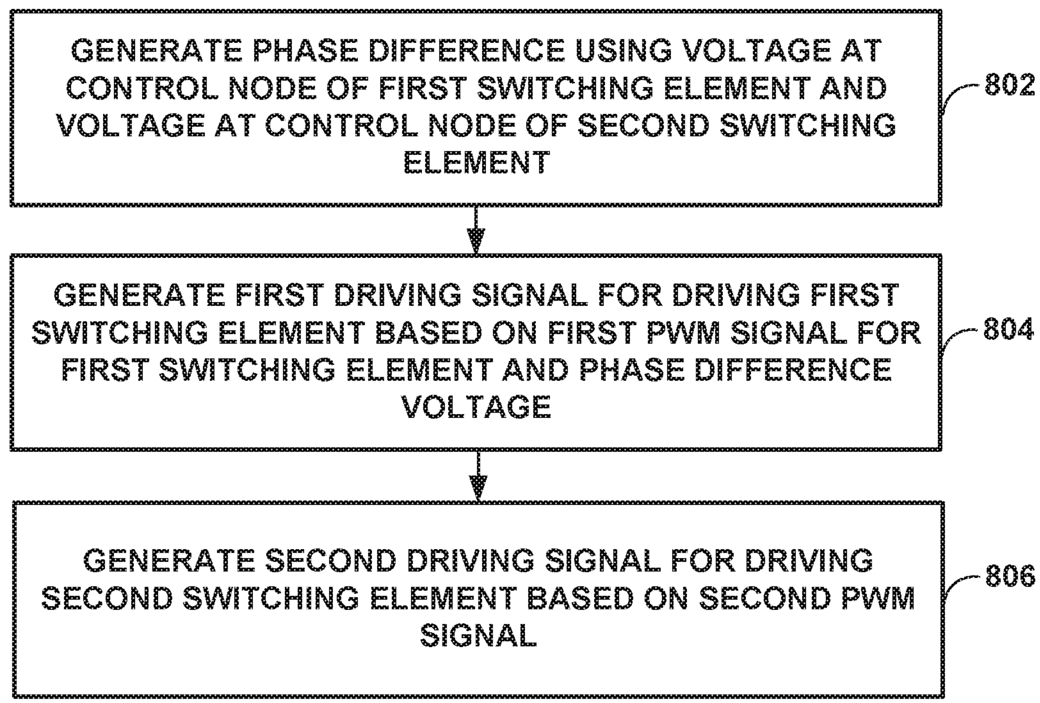
FIG. 8 is a first flow diagram consistent with techniques that may be performed by the example system of FIG. 1, in accordance with this disclosure.

FIG. 8 is a first flow diagram consistent with techniques that may be performed by the example system of FIG. 1, in accordance with this disclosure. FIG. 8 is discussed with reference to FIGS. 1-6. 7A, 7B for example purposes only. Phase detector 110 generates a phase difference using voltage at control node 107 of first switching element 106 and voltage at control node of second switching element 108 (802). Voltage-controlled delay module 114 generates first driving signal for driving first switching element 106 based on a first PWM signal for first switching element 106 and the phase difference voltage (804). Fixed delay module 120 generates second driving signal for driving second switching element 108 based on second PWM signal (806).

Figure 9:
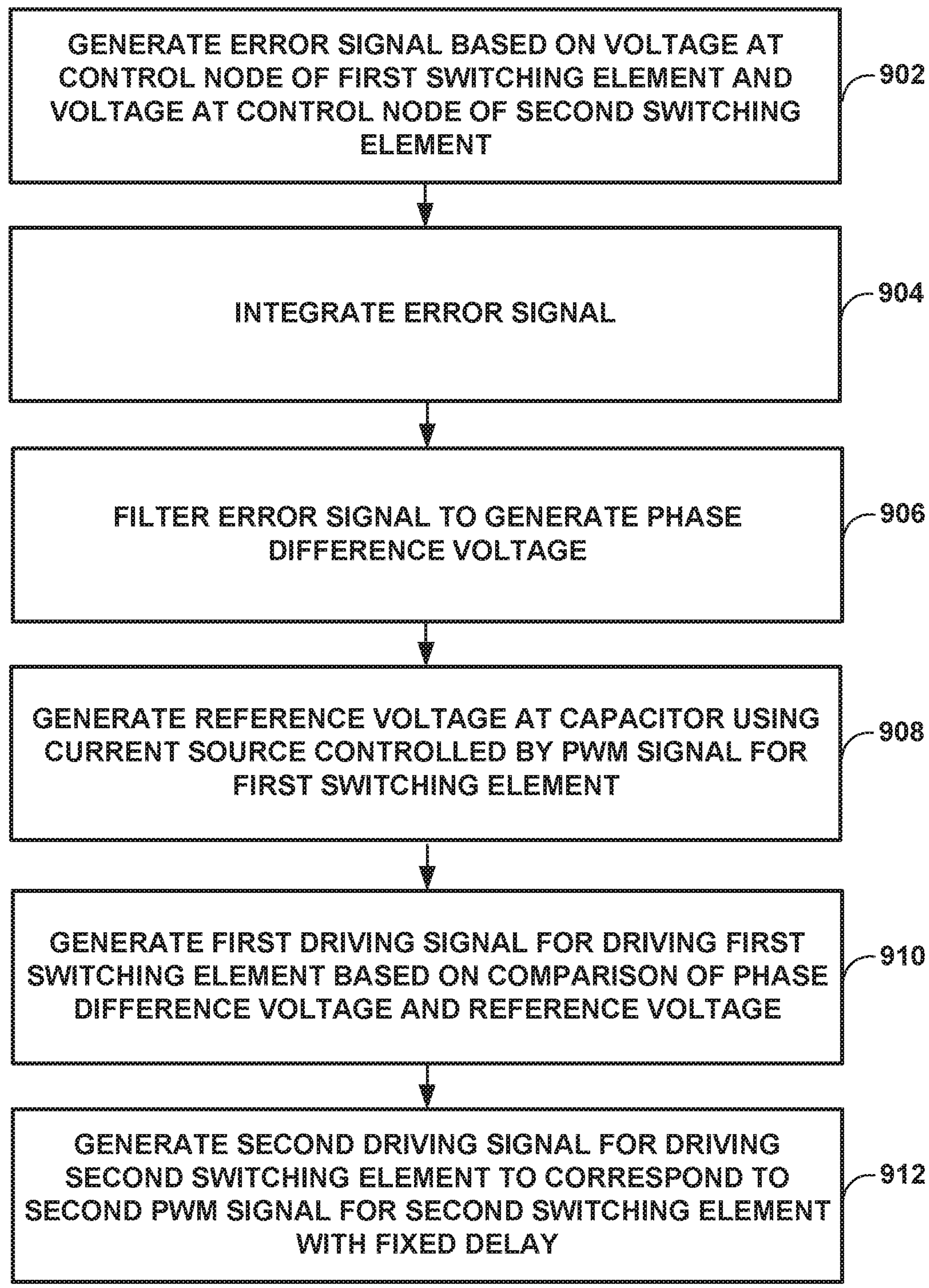
FIG. 9 is a second flow diagram consistent with techniques that may be performed by the example system of FIG. 1, in accordance with this disclosure.

FIG. 9 is a second flow diagram consistent with techniques that may be performed by the example system of FIG. 1, in accordance with this disclosure. FIG. 9 is discussed with reference to FIGS. 1-6, 7A, 7B, 8 for example purposes only. Phase detector 210 generates error signal based on voltage at control node 207 of first switching element 206 and voltage at control node 209 of second switching element 208 (902). Charge pump 230 integrates the error signal (904). Low pass filter 232 filters the error signal to generate a phase difference voltage (906). Voltage-controlled delay module 214 generates a reference voltage at a capacitor using a current source controlled by PWM signal for first switching element 206 (908). For example, voltage-controlled delay module 314 generates a reference voltage at capacitor 352 using current source 350 controlled by a PWM signal for first switching element 206. Voltage-controlled delay module 314 generates a first driving signal for driving first switching element 206 based on comparison of the phase difference voltage and a reference voltage (910). For example, comparator 356 generates a first driving signal for driving first switching element 206 based on comparison of the phase difference voltage and a reference voltage at capacitor 352. Fixed delay module 220 generates second driving signal for driving second switching element to correspond to second PWM signal for second switching element with fixed delay module (912).

The following examples may illustrate one or more aspects of the disclosure.

Example 1

A circuit for controlling switching elements and controlling dead-time of the switching elements, the circuit configured to: generate a phase difference voltage using voltage at a control node of a first switching element and voltage at a control node of a second switching element, the first switching element configured to couple a first node of a supply and a switch node based on voltage at the control node of the first switching element and the second switching element configured to couple the switch node and a second node of the supply based on voltage at the control node of the second switching element; generate a first driving signal based on a first pulse width modulation (PWM) signal for the first switching element and the phase difference voltage, wherein the first driving signal includes a voltage-controlled delay module, and generate a second driving signal for driving the second switching element based a second PWM signal for the second switching element.

Example 2

The circuit of example 1, wherein, to generate the first driving signal, the circuit is configured to generate the first driving signal based on the phase difference voltage and a reference voltage generated based on the first PWM signal.

Example 3

The circuit of any combination of examples 1-2, wherein, to generate the first driving signal, the circuit is configured to generate the first driving signal based on a comparison of the phase difference voltage and the reference voltage generated based on the first PWM signal.

Example 4

The circuit of any combination of examples 1-3, wherein the circuit comprises: a capacitor configured to store the reference voltage; a current source configured to charge the capacitor when the first PWM signal indicates an enabled state; and a switching element configured to discharge the capacitor when the first PWM signal is not in the enabled state.

Example 5

The circuit of any combination of examples 1-4, wherein the circuit comprises: a comparator configured to compare the reference voltage stored at the capacitor and the phase difference voltage to generate the first driving signal.

Example 6

The circuit of any combination of examples 1-5, wherein, to generate the first driving signal, the circuit is configured to: generate the first driving signal to switch in the first switching element in response to voltage at the capacitor being greater than the phase difference voltage and to switch out the first switching element in response to voltage at the capacitor being not greater than the phase difference voltage.

Example 7

The circuit of any combination of examples 1-6, wherein, to generate the first driving signal, the circuit is configured to: generate, using a phase detector, an unfiltered error signal based on voltage at the control node of the first switching element and voltage at the control node of the second switching element; and filter, using a low pass filter, the unfiltered error signal to generate the phase difference voltage.

Example 8

The circuit of any combination of examples 1-7, wherein the circuit is configured to: integrate, using a charge pump, a magnitude of the unfiltered error signal before filtering.

Example 9

The circuit of any combination of examples 1-8, wherein the low pass filter comprises: a resistive element comprising a first node configured to receive the unfiltered error signal from the charge pump and a second node configured to output the phase difference voltage; and a capacitor coupled to the second node of the resistive element.

Example 10

The circuit of any combination of examples 1-9, wherein, to generate the phase difference voltage, the circuit is configured to: generate a state signal for the first switching element using a comparison of an indication of voltage at the control node of the first switching element with a first threshold; generate a state signal for the second switching element using a comparison of an indication of voltage at the control node of the second switching element with a second threshold; and generate the phase difference voltage using the state signal for the first switching element and the state signal for the second switching element.

Example 11

The circuit of any combination of examples 1-10, wherein the circuit comprises: a first source-follower element configured to generate a voltage signal corresponding to voltage at the control node of the first switching element; a first attenuation module configured to generate the indication of voltage at the control node of the first switching element using the voltage signal of voltage at the control node of the first switching element; a first comparator configured to compare the indication of voltage at the control node of the first switching element with the first threshold and output the state signal for the first switching element; a second source-follower element configured to generate a voltage signal corresponding to voltage at the control node of the second switching element; a second attenuation module configured to generate the indication of voltage at the control node of the second switching element using the voltage signal corresponding to voltage at the control node of the second switching element; and a second comparator configured to compare the indication of voltage at the control node of the second switching element with the second threshold and output the state signal for the second switching element.

Example 12

The circuit of any combination of examples 1-11, wherein, to generate the second driving signal, the circuit is configured to: generate the second driving signal to correspond to the second PWM signal with a fixed delay module.

Example 13

The circuit of any combination of examples 1-12, wherein, to generate the first driving signal, the circuit is configured to: generate the first driving signal to include zero dead-time with the second driving signal.

Example 14

The circuit of any combination of examples 1-13, wherein the circuit is an analog circuit.

Example 15

A method for controlling switching elements and controlling dead-time of the switching elements, the method comprising: generating, by processing circuitry, a phase difference voltage using voltage at a control node of a first switching element and voltage at a control node of a second switching element, the first switching element configured to couple a first node of a supply and a switch node based on voltage at the control node of the first switching element and the second switching element configured to couple the switch node and a second node of the supply based on voltage at the control node of the second switching element; generating, by the processing circuitry, a first driving signal based on a first pulse width modulation (PWM) signal for the first switching element and the phase difference voltage, wherein the first driving signal includes a voltage-controlled delay module; and generating, by the processing circuitry, a second driving signal for driving the second switching element based a second PWM signal for the second switching element.

Example 16

The method of example 15, wherein generating the first driving signal is based on the phase difference voltage and a reference voltage generated based on the first PWM signal.

Example 17

The method of any combination of examples 15-16, wherein, to generate the first driving signal, the circuit is configured to generate the first driving signal based on a comparison of the phase difference voltage and the reference voltage generated based on the first PWM signal.

Example 18

The method of any combination of examples 15-17, wherein a capacitor is configured to store the reference voltage; wherein a current source is configured to charge the capacitor when the first PWM signal indicates an enabled state, and wherein a switching element is configured to discharge the capacitor when the first PWM signal is not in the enabled state.

Example 19

The method of any combination of examples 15-18, wherein a comparator is configured to compare the reference voltage stored at the capacitor and the phase difference voltage to generate the first driving signal.

Example 20

A system comprising: a first switching element configured to couple a first node of a supply and a switch node based on voltage at a control node of the first switching element; a second switching element configured to couple the switch node and a second node of the supply based on voltage at a control node of the second switching element; and processing circuitry for controlling dead-time, the processing circuitry configured to: generate a phase difference voltage using voltage at the control node of the first switching element and voltage at the control node of the second switching element; generate a first driving signal based on a first pulse width modulation (PWM) signal for the first switching element and the phase difference voltage, wherein the first driving signal includes a voltage-controlled delay module; and generate a second driving signal for driving the second switching element based a second PWM signal for the second switching element.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various aspects have been described in this disclosure. These and other aspects are within the scope of the following claims.

The invention claimed is:

1. A circuit for controlling switching elements and controlling dead-time of the switching elements, the circuit configured to:

generate a phase difference voltage using voltage at a control node of a first switching element and voltage at a control node of a second switching element, the first switching element configured to couple a first node of a supply and a switch node based on voltage at the control node of the first switching element and the second switching element configured to couple the switch node and a second node of the supply based on voltage at the control node of the second switching element;

generate a first driving signal based on a comparison of the phase difference voltage and a reference voltage generated based on a first pulse width modulation (PWM) signal for the first switching element; and generate a second driving signal for driving the second switching element based on a second PWM signal for the second switching element.

2. The circuit of claim 1, wherein the circuit comprises:

a capacitor configured to store the reference voltage;

a current source configured to charge the capacitor when the first PWM signal indicates an enabled state; and a switching element configured to discharge the capacitor when the first PWM signal is not in the enabled state.

3. The circuit of claim 2, wherein the circuit comprises:

a comparator configured to compare the reference voltage stored at the capacitor and the phase difference voltage to generate the first driving signal.

4. The circuit of claim 1, wherein, to generate the first driving signal, the circuit is configured to:

generate the first driving signal to switch in the first switching element in response to voltage at the capacitor being greater than the phase difference voltage and to switch out the first switching element in response to voltage at the capacitor being not greater than the phase difference voltage.

5. A circuit for controlling switching elements and controlling dead-time of the switching elements, the circuit configured to:

generate a phase difference voltage using voltage at a control node of a first switching element and voltage at a control node of a second switching element, the first switching element configured to couple a first node of a supply and a switch node based on voltage at the control node of the first switching element and the second switching element configured to couple the switch node and a second node of the supply based on voltage at the control node of the second switching element, wherein, to generate the phase difference voltage, the circuit is configured to generate, using a phase detector, an unfiltered error signal based on voltage at the control node of the first switching element and voltage at the control node of the second switching element and filter, using a low pass filter, the unfiltered error signal to generate the phase difference voltage;

generate a first driving signal based on a first pulse width modulation (PWM) signal for the first switching element and the phase difference voltage, wherein the first driving signal includes a voltage-controlled delay module; and generate a second driving signal for driving the second switching element based a second PWM signal for the second switching element.

6. The circuit of claim 5, wherein the circuit is configured to:

integrate, using a charge pump, a magnitude of the unfiltered error signal before filtering.

7. The circuit of claim 6, wherein the low pass filter comprises:

a resistive element comprising a first node configured to receive the unfiltered error signal from the charge pump and a second node configured to output the phase difference voltage; and a capacitor coupled to the second node of the resistive element.

8. A circuit for controlling switching elements and controlling dead-time of the switching elements, the circuit configured to:

generate a phase difference voltage using voltage at a control node of a first switching element and voltage at a control node of a second switching element, the first switching element configured to couple a first node of a supply and a switch node based on voltage at the control node of the first switching element and the second switching element configured to couple the switch node and a second node of the supply based on voltage at the control node of the second switching element, wherein, to generate the phase difference voltage, the circuit is configured to:

generate a state signal for the first switching element using a comparison of an indication of voltage at the control node of the first switching element with a first threshold;

generate a state signal for the second switching element using a comparison of an indication of voltage at the control node of the second switching element with a second threshold; and generate the phase difference voltage using the state signal for the first switching element and the state signal for the second switching element;

generate a first driving signal based on a first pulse width modulation (PWM) signal for the first switching element and the phase difference voltage; and generate a second driving signal for driving the second switching element based a second PWM signal for the second switching element.

9. The circuit of claim 8, wherein the circuit comprises:

a first source-follower element configured to generate a voltage signal corresponding to voltage at the control node of the first switching element;

a first attenuation module configured to generate the indication of voltage at the control node of the first switching element using the voltage signal of voltage at the control node of the first switching element;

a first comparator configured to compare the indication of voltage at the control node of the first switching element with the first threshold and output the state signal for the first switching element;

a second source-follower element configured to generate a voltage signal corresponding to voltage at the control node of the second switching element;

a second attenuation module configured to generate the indication of voltage at the control node of the second switching element using the voltage signal corresponding to voltage at the control node of the second switching element; and a second comparator configured to compare the indication of voltage at the control node of the second switching element with the second threshold and output the state signal for the second switching element.

10. The circuit of claim 1, wherein, to generate the second driving signal, the circuit is configured to:

generate the second driving signal to correspond to the second PWM signal with a fixed delay.

11. The circuit of claim 1, wherein, to generate the first driving signal, the circuit is configured to:

generate the first driving signal to include zero dead-time with the second driving signal.

12. The circuit of claim 1, wherein the circuit is an analog circuit.

13. A method for controlling switching elements and controlling dead-time of the switching elements, the method comprising:

generating, by processing circuitry, a phase difference voltage using voltage at a control node of a first switching element and voltage at a control node of a second switching element, the first switching element configured to couple a first node of a supply and a switch node based on voltage at the control node of the first switching element and the second switching element configured to couple the switch node and a second node of the supply based on voltage at the control node of the second switching element;

generating, by the processing circuitry, a first driving signal based on a first pulse width modulation (PWM) signal for the first switching element and the phase difference voltage, wherein generating the first driving signal is based on a comparison of the phase difference voltage and a reference voltage generated based on the first PWM signal; and generating, by the processing circuitry, a second driving signal for driving the second switching element based on a second PWM signal for the second switching element.

14. The method of claim 13, wherein a capacitor is configured to store the reference voltage;

wherein a current source is configured to charge the capacitor when the first PWM signal indicates an enabled state; and wherein a switching element is configured to discharge the capacitor when the first PWM signal is not in the enabled state.

15. The method of claim 14, wherein a comparator is configured to compare the reference voltage stored at the capacitor and the phase difference voltage to generate the first driving signal.

16. A system comprising:

a first switching element configured to couple a first node of a supply and a switch node based on voltage at a control node of the first switching element;

a second switching element configured to couple the switch node and a second node of the supply based on voltage at a control node of the second switching element; and a circuit for controlling dead-time, the circuit configured to:

generate a phase difference voltage using voltage at the control node of the first switching element and voltage at the control node of the second switching element;

generate a first driving signal based on a comparison of the phase difference voltage and a reference voltage generated based on a first pulse width modulation (PWM) signal for the first switching element; and generate a second driving signal for driving the second switching element based on a second PWM signal for the second switching element.

* * * * *